FLUID AMPLIFIER AND METHOD OF MANUFACTURE

Original Filed Dec. 31, 1962

Inventor
Willis A. Boothe
by Louis A. Moucha

United States Patent Office 3,442,280

Patented May 6, 1969

3,442,280

FLUID AMPLIFIER AND METHOD OF MANUFACTURE

Willis A Boothe, Scotia, N.Y., assignor to General Electric Company, a corporation of New York Original application Dec. 31, 1962, Ser. No. 248,630. Divided and this application June 27, 1966, Ser. No. 560,735

Int. Cl. F15c *1/10, 5/00*

U.S. Cl. 137—81.5 2 Claims

ABSTRACT OF THE DISCLOSURE

Fluid amplifiers having identical fluid flow paths and differing only in fluid flow capacity are fabricated from a plurality of laminations superposed between two cover members which may also be comprised of laminations. The laminations intermediate the cover members have the desired fluid flow pattern formed therethrough and a predetermined number of these laminations are superposed between the cover members to obtain the desired flow capacity. The fluid flow restrictors in the input flow paths of each flow pattern may be identical in shape to provide fluid flow restrictors having rectangular cross sections or may be nonidentical in shape to provide predetermined odd shaped cross sections.

This is a division of application Ser. No. 248,630, filed Dec. 31, 1962, now abandoned, and assigned to the assignee of this present invention.

My invention relates to a fluid amplifier device and in particular, to a new structural arrangement for fluid amplifier devices and to a method of fabrication thereof.

Fluid amplifier devices have an important place in the field of fluid power and control and are especially useful as analog and digital computating elements. These devices feature inherent reliability since they generally employ no moving parts, and very low cost since they may be fabricated from virtually any material that is nonporous and has structural integrity. The devices will operate on both incompressible fluids such as liquids and compressible fluid such as gases, including air, it being understood that the material comprising the fluid amplifier be compatible with the fluid passing therethrough.

Fluid amplifiers operate on the basis of deflecting a fluid power jet. In the conventional form, a constant main fluid flow comprising a relatively high pressure power jet issues from a fluid flow restrictor, a power nozzle, and impinges upon at least one of two fluid flow receivers. A deflection or control of the power jet is obtained by means of a control fluid flow comprising a relatively low pressure control jet issuing from a pair of fluid flow restrictors, control nozzles, positioned in opposing relationship to the power jet and generally perpendicular thereto. The arrangement of the power nozzle, control nozzles and receivers described, form what is conventionally known as a fluid amplifier, it being understood that the amplifier designation is in no way a limitation on the possible use of the device. Thus, in addition to pure amplification for fluid power applications, the fluid amplifier may be employed in digital computer circuits to AND or OR logic functions and in analog computer circuits to perform mathematical functions such as addition and integration.

A broad class of fluid amplifiers may have identical arrangements of power and control nozzles and receivers, and differ only in flow capacity or fluid pressure range ratings. Previous methods for fabricating fluid amplifiers have involved techniques such as photoetching in glass or plastic, molding and machining. All of these fabricating techniques result in a fluid amplifier constructed from a single piece of material containing the fluid flow configuration and a cover member. Thus to produce a plurality of fluid amplifiers having identical configurations of fluid flow paths therein but differing in flow capacities has necessitated further fabrication steps, an economically inefficient method for large scale production. For specialized fluid amplifier applications where odd shaped fluid flow restrictors are necessary, the previous fabricating techniques have required setting up separate fabrication lines to obtain the different shapes. Since one of the chief advantages of fluid amplifiers should be their very low cost, a need exists for developing an economically practical method for fabricating fluid amplifiers which have identical arrangements of fluid flow elements and differ only in flow capacity. This economically practical method should also provide a simple means for fabricating fluid amplifiers having odd shaped fluid flow restrictors.

Therefore, one of the principal objects of my invention is to develop a new structural arrangement of a fluid amplifier and an economically efficient method of manufacture thereof.

Another object of my invention is to develop an economically efficient method for fabricating a plurality of fluid amplifiers which differ only in their flow capacity rating.

A still further object of my invention is to develop an economically efficient method for fabricating a fluid amplifier having odd shaped fluid flow restrictors.

A feature of my invention which is useful in the fulfillment of the foregoing objects includes a method for fabricating a fluid amplifier device that consists of severing thin sheets of nonporous structurally rigid material to form a plurality of laminations and then individually punching a particular fluid flow configuration through selected ones of the laminations. A predetermined number of the punched-through laminations are then superposed between two unpunched laminations to obtain the desired flow capacity of the amplifier, and the laminations are fastened together in a suitable manner such as by an adhesive, diffusion bonding or brazing to form a unitary structure.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawing, wherein like parts in each of the several figures are indentified by the same reference character and wherein:

Figure 1:
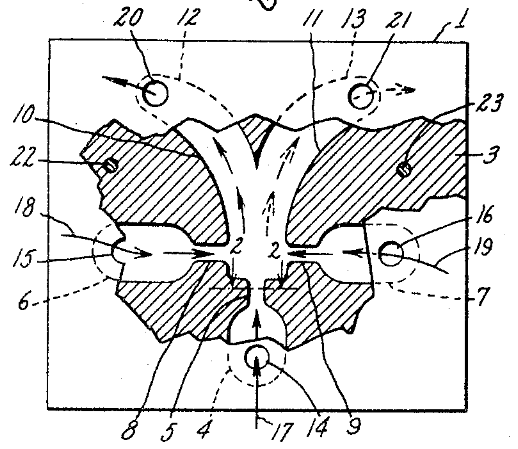
FIGURE 1 is a plan view of a digital fluid amplifier constructed in accordance with my invention with the top lamination containing fluid entrance and exit means being partly broken away to illustrate the laminations containing the punched-through fluid flow configuration.

Conventional fluid amplifiers comprise a structure that is constructed from at least two components. A fluid flow configuration is provided in a base member, and a flat cover member is then attached thereto for confining the fluid flow within paths defined by the configuration and the enclosing surface of the cover member, An economically efficient method for fabricating fluid amplifiers on a large production scale must involve a process whereby the various components of the amplifier are produced very rapidly from a low cost material. Since the fluid flow passages defined by the configuration are generally rectangular in cross section, a very rapid process for producing amplifiers having identical fluid flow configurations could employ the stamping of components and punching the desired configuration therethrough. Suitable machines can perform these operations at a very rapid rate. This relatively simple and economical method would consist in stamping the amplifier in three separate components wherein one part would have the fluid flow configuration punched therethrough and the other two pieces would form cover members on either side thereof. The problem with this simple approach is that it is not desirable to punch configurations which have width dimensions approaching the thickness of the material being punched since this produces roughness on the bottom edges of the punched configuration. In a fluid amplifier, restrictor flow passages which form the nozzles may have a considerably smaller dimension in width than in depth. This is particularly true in the larger flow capacity amplifiers wherein the configuration of the various flow paths may be identical to smaller flow capacity amplifiers, the increased flow capacity being obtained by increasing the thickness dimension of the amplifier. It is especially desirable to have the fluid flow restrictors considerably narrower than the overall thickness of the amplifier for aerodynamic reasons.

A method of fabricating fluid amplifiers in accordance with my invention basically employs the above suggested method but overcomes the inherent disadvantages therein described. My method consists in forming the fluid amplifier from a plurality of superposed thin laminations containing the fluid flow pattern and then fastening other laminations in a suitable manner to enclose the fluid flow pattern and form a unitary structure. My method of fabricating fluid amplifiers is as follows: The first step involves severing in a suitable manner such as by stamping or cutting, a relatively thin sheet of nonporus structurally rigid material to form a plurality of equidimensional stampings or laminations. This cutting process may be performed very rapidly with a suitable machine. A plurality of coincident guide holes may then be simultaneously punched through each of these laminations. It is to be understood that this guide hole punching process is not essential to the overall fabrication method but it does aid in the further process of superposing and assembling the laminations to form a unitary structure as described hereinafter. The material from which the laminations are formed depends upon the particular enivonment in which the fluid amplifier will operate. Thus for high temperature applications such as in a gas turbine power plant or nuclear power plant the material may be stainless steel. For room temperature applications such as in machine tool control, the material may be brass, aluminum, copper or mild steel. The materials are not limited to metals, and glass and low cost plastics such as polyesters and polyvinyl chloride may also be employed. For relatively low pressure and low temperature applications a material such as cardboard may even be used. The proper selection of the appropriate material involves determining the most economical material which will be compatible in the environment of the fluid amplifier and which is most readily adapted to the various steps included in my method of fabrication. The thickness of the sheet of material that is cut into laminations may conventiently be from .003 to .005 inch, although this range is not to be construed as a limation.

In the next step, a first group of selected ones of the laminations are successively punched through with a particular fluid flow configuration or pattern. In the alternative, the coincident guide holes and flow pattern may be simultaneously punched to increase production speed. The fluid flow pattern includes the various fluid flow restrictions such as the power and control nozzles, fluid supply means in the form of input flow paths to these restrictions, fluid flow paths which carry the jets that issue from the restrictions, and fluid flow receivers which form the selective outputs of the fluid flow paths. For fabricating fluid amplifiers having fluid flow restrictors and flow paths of rectangular cross sections, an identical and coincident fluid flow configuration is punched through each of the laminations forming the first group.

A second group of the laminations are then successively punched with a plurality of coincident round holes which form the fluid entrance and exit means in the top or cover member of the amplifier. These holes are positioned so as to be superimposed over selected regions of the input flow paths and receivers in the first group of laminations. A third group of the equidimensional laminations containing at most only the punched guide holes, are used to form the base members of the fluid amplifiers. It should be apparent that the guide holes have been punched outside the fluid flow configuration and are preferably on opposing sides of the equidimensional laminations to provide adequate guide means for superposing the laminations.

A unitary structure is next assembled from the laminations. A predetermined number of laminations from the first group, the fluid flow configuration punched through laminations, are superposed in congruent relationship whereby the various flow paths and fluid flow restrictors coincide to form smooth vertical walls within the fluid amplifier. This smooth surface which permits smooth fluid flow within the amplifier, is achieved since the material from which the laminations have been cut is thinner than any of the width dimensions in the fluid flow configuration and no rough edged laminations are formed in the configuration punching process. The number of these laminations is determined by the flow capacity range of the resulting fluid amplifier. Thus a large flow capacity amplifier employs a larger number of these laminations than a smaller flow capacity amplifier. The laminations from this first group are superposed between at least one lamination from the second group containing the punched through fluid entrance and exit holes and at least one lamination from the third group containing only the punched through guide holes. It should be apparent that the most convenient method for superposing the laminations of the three groups is to first place the laminations from the third group in place and then superpose thereon the laminations from the first group and finally the laminations from the second group. The number of laminations from the second and third groups that are employed in a particular fluid amplifier are determined primarily by the fluid pressure therein and the material forming the laminations. Thus for a low pressure fluid flow it may be possible to employ only one lamination from each of these two groups. As a practical matter, the laminations from these second and third groups, which form respectively the top and bottom members of the fluid amplifier, may each comprise several laminations. The top member in particular may consist of several laminations in order to provide adequate support means within the fluid flow entrance and exit holes for external hose tubing or piping connections to the fluid amplifier whereby fluid may be supplied respectively thereto and away therefrom. The superpositioning of the various laminations may be performed automatically by a suitable machine or by hand. If the guide holes are punched through the laminations, guide pins may be inserted therein for accurate superpositioning of the various laminations.

The superposed laminations are then fastened together in a suitable manner to form a hermetically sealed unitary structure. The fastening may be accomplished by mechanical means, by use of an adhesive or by metallurgical joining methods in the particular case of metallic materials. The mechanical method may consist of passing threaded rods through the guide holes and then clamping the laminations together by tightening a nut and washer arrangement on the rods. Bolts may also be screwed through the guide holes and the laminations clamped together by tightening nuts thereon. Numerous other mechanical methods may also be utilized, the aforementioned examples being merely illustrative of two methods.

An adhesive may be employed as the fastening agent for relatively low temperature applications of the fluid amplifier. Suitable adhesives are a polyurethene adhesive which is especially appropriate for cryogenic applications, and a silicone adhesive which may be employed in temperature applications from −80° C. to +225° C. An adhesive which is suitable for use at room temperature consists of equal parts by weight of a polyamide and epoxy resin. No primer or catalyst is required in applying this adhesive and it may be cured at room temperature or an elevated temperature as high as 80° C. to effect more rapid curing. This adhesive is strong and relatively independent of the thickness of adhesive applied. Further, this adhesive is relatively impermeable and inert to most fluids at room temperatures and satisfactorily joins most metals and many plastics such as polyester.

Another method for fastening the superposed laminations especially for relatively high temperature applications, is diffusion bonding in the case of metallic laminations. In this method the metallic interfaces are first cleaned and then assembled under pressure to achieve good physical contact between laminations. The assembly is then placed within an extremely dry hydrogen atmosphere in a furnace and maintained at an elevated temperature for a predetermined length of time. Specifically for stainless steel, the assembly is heat treated for approximately one hour at 700° F. At a higher temperature the time interval may be decreased, thus at 750° F. the heat treatment interval is only fifteen minutes.

Another method for fastening metallic laminations together is brazing. This method employs higher temperatures and shorter time intervals than diffusion bonding whereby faster production may be attained. The brazing is accomplished by applying a suitable braze or filler material between the laminations and then induction heating the assembly in a hydrogen furnace. Since stainless steel may be brazed within several minutes at temperatures between 1100° F. and 1600° F., the fabricated fluid amplifier may be employed in the relatively highest temperature applications, just below the brazing temperature such as 1000° F.

A further method for fastening the laminations together requires a previous step of punching undersized guide holes through each lamination. The laminations are then forced down over normal sized guide pins to provide a force fit. The guide pins are coincident with and equal in number to the guide holes and are retained within a base member to serve as individual mandrels. No further fastening would then be necessary since the force fit can provide a hermetic seal.

After the laminations have been fastened together by any of the above mentioned methods, the fluid amplifier could be put into use merely by inserting suitable tubing, hoses or piping into the punched-through fluid entrance and exit holes. Although these holes are round, leakage may occur at these junctions due to the nonrigid connection, especially in higher fluid pressure applications. These holes are therefore preferably tapped, prior to assembly of the laminations to form internal screw threads therein whereby suitable tubing connections are provided. The coupling end of the tubing may then be threaded into this tapped hole to provide leak free connections. In the alternative, manifolding means may be employed instead of tubing and tapped holes.

Referring particularly to the plan view of a fluid amplifier fabricated in accordance with my invention and illustrated in FIGURE 1, there is shown a top lamination, designated as a whole by numeral 1, partially broken away to illustrate a lamination indicated as sectioned layer 3 containing a punched-through fluid flow configuration. The fluid flow configuration illustrated herein includes a main fluid input flow path or supply means 4, a fluid flow restrictor 5 which functions as a power nozzle, two control fluid input flow paths or supply means 6, 7 and their associated fluid flow restrictors which function as control nozzles 8 and 9 respectively, fluid flow paths 10 and 11 which form passage means for the deflected power jet, and fluid flow receivers 12 and 13 which are adapted to receive the deflected power jet. Fluid entrance holes 14, 15 and 16 are positioned to be in fluid communication with the respective input flow paths 4, 6, 7 over which they are superposed. Thus, fluid entrance hole 14 provides a passage wherein a tubing connection may be inserted and a main fluid supplied therethrough as indicated by arrow 17. The main fluid flow then enters main fluid input means 4 and since the fluid is under pressure, it passes through fluid flow restrictor 5 and issues therefrom as a power jet. In like manner control fluid flows indicated by arrows 18 and 19 enter respective fluids entrance holes 15 and 16 and pass into control fluid input flow passage means 6 and 7 respectively and issue from fluid flow restrictors 8 and 9 as control jets. These control jets provide a deflection of the power jet whereby the deflected power jet is directed toward a predetermined fluid flow receiver 12 or 13 in accordance with the differential pressure or fluid flow of the two control jets. Thus, the power jet is deflected to receiver 12, as illustrated by the solid arrows approaching thereto when the fluid pressure or flow capacity is greater at control fluid flow restrictor 9 than at restrictor 8. In like manner when the pressure or flow is greater at restrictor 8 than 9, the power jet is deflected toward receiver 13 as indicated by the dash lines. After the fluid enters receivers 12 or 13 it passes through respective fluid exit holes 20 or 21 in the top lamination and then passes out of the fluid amplifier through tubing or manifolding means which is suitably connected therein.

In the particular fluid flow configuration illustrated in FIGURE 1, a minimum number of two guide holes 22, 23, need be employed to fix the superposed laminations in coincident relationship and thereby provide smooth walls for smooth fluid flow within the amplifier. The need for only two guide holes results from the fact that the fluid flow pattern is completely enclosed within the boundary of the laminations.

Figure 2:
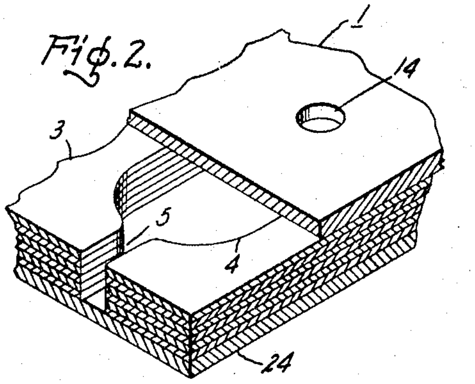
FIGURE 2 is an enlarged fragmentary view of a rectangular cross section flow restriction, the restrictor being the power nozzle taken on the plane of line 2—2 of FIGURE 1, the view being shown in perspective.

The fluid flow pattern punched through the first group of laminations 3 may be identical in each of these laminations. In such case the fluid flow restrictors have a rectangular cross section as illustrated in FIGURE 2. This illustration is an enlarged fragmentary view shown in perspective and taken on the plane of line 2—2 of FIGURE 1 and thus illustrates the power nozzle 5 restrictor. Although the laminations comprising the fluid amplifier may all be of equal thickness, the enclosing members, top and bottom members 1 and 24 respectively, may comprise relatively thicker laminations than those of the fluid flow configuration punched through laminations. This alternative permits the use of but a single top and bottom member lamination rather than the possible need for employing several of the thin laminations in place thereof as herefore described.

Figure 3:
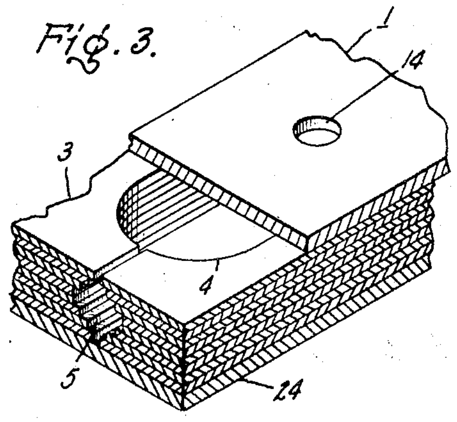
FIGURE 3 illustrates a second embodiment of a power nozzle as shown in FIGURE 2, this particular configuration illustrating an odd shaped flow restriction.

For some applications it is desirable to use contoured or odd shaped fluid flow restrictors such as the diamond shape 5 of FIGURE 3. The intersection of jets from such odd shapes produce predictable reactions which may be employed in fluid function geneartors. Such odd shaped restrictors may be made by slightly varying from lamination to lamination the restrictor portion of the fluid flow pattern that is punched through the laminations 3 of the first group.

Figure 4:
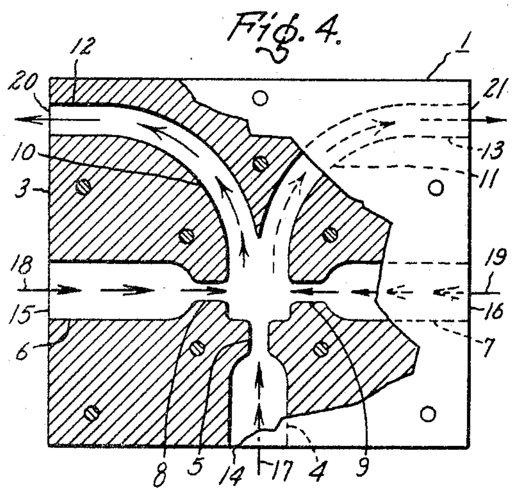
FIGURE 4 illustrates a second embodiment of a fluid amplifier as shown in FIGURE 1, this particular amplifier having fluid entrance and exit means disposed in the sides thereof.

The fluid entrance and exit means of a fluid amplifier need not be disposed within top member 1. FIGURE 4 illustrates a second embodiment of a fluid amplifier wherein the fluid entrance and exit means are disposed within the sides of the laminations containing the fluid flow patterns. In this particular embodiment, the desired fluid flow pattern extends to the edges of the laminations 3 whereby punching through these laminations results in a plurality of individual pieces being formed in each lamination layer. A greater number of guide holes must be employed in this embodiment since at least two guide holes per individual piece are necessary for proper assembly of this amplifier. Further, the guide holes here are not merely a convenience for assembly purposes but are necessary to obtain smooth walls within the amplifier. The top and bottom members 1 and 24 of the amplifier may comprise a single or plurality of the thin laminations as heretofore described or may comprise single relatively thick laminations as indicated in FIGURES 2 and 3. The laminations are superposed and fastened together by any of the previously described techniques. After the assembling step, fluid entrance and exit holes are provided at the input and output flow passage defined at the edges of the laminations. Thus round holes 14, 15, 16, 20 and 21 are drilled into input flow paths 4, 6, 7 and receivers 12 and 13 respectively, to provide the necessary round configuration for external tubing connections. It should be apparent that these round holes are not drilled if the cross section of the flow passages is already circular. In the most common applications this cross section will be rectangular since laminations having identical punched through fluid flow patterns will be superposed to form the flow passages. The drilled holes are then tapped to form internal screw threads for the tubing connections. The advantages of the fluid path configuration illustrated in the FIGURE 4 embodiment are the lower turbulence and losses produced by the fluid entering or exiting from the fluid amplifier. In the FIGURE 1 embodiment, a higher degree of turbulence will occur since the fluid encounters 90° bends as it enters and exits from the punched through fluid flow configuration.

The sizes of fluid amplifiers are conventionally designated in terms of the width dimension of the power jet restrictor. Small size amplifiers have restrict widths from .005 to .020 inch, medium size amplifiers from .020 to 0.100 inch, and large size amplifiers from .100 inch upward. The method herein described for fabricating fluid amplifiers is especially useful in manufacturing amplifiers having restrictor widths greater than .010 inch.

From the foregoing description, it can be appreciated that my invention makes available a new method for fabricating a fluid amplifier having a new structural arrangement consisting of a plurality of superposed laminations. A fluid flow pattern defined within the amplifier is produced by a relatively simple, rapid and economical process of successively punching the pattern through selected laminations. These laminations are then assembled to a desired overall thickness between laminations which are unpunched with the fluid flow pattern and this assembly is then fastened in a suitable manner to form the unitary structure of the fluid amplifier. Fluid amplifiers having odd shaped fluid flow restrictors are also readily fabricated by this method by slightly varying the restrictor portion of the fluid flow pattern from lamination to lamination. Two embodiments of my new method for fabricating fluid amplifiers have been disclosed herein, namely, a first method which includes punching a fluid flow pattern that is totally enclosed with the boundary of the laminations and a second method wherein this pattern extends to the edges of the laminations. In each of these embodiments the laminations forming the top and bottom enclosing members may comprise laminations having the same thickness as the pattern punched laminations therebetween or thicker laminations whereby only one top and bottom lamination need be used. The new structural arrangement of the assembled fluid amplifier may have fluid flow restrictions of rectangular cross section in the case where indentical pattern punched laminations are employed or may have odd shaped cross sections where nonidentical laminations are employed.

Having described new structural arrangements for fluid amplifiers and new methods for fabricating the devices in accordance with my invention, it is believed obvious that other modifications and variations of my invention are possible in the light of the above teachings. For example, the laminations containing the punched-through fluid flow configuration need not all be of the same thickness dimension and thereby provide greater flexibility in obtaining odd shaped cross section. Also, the fluid entrance and exit holes need not all be confined either to the top member or the sides of the structure, but may have some of the holes located within the top member and the remaining ones within the sides of the structure. Further, although only digital type fluid amplifiers have been illustrated herein, analog type fluid amplifiers may also be constructed in accordance with the methods described hereinabove.

What I claim as new and desire to secure by Letters Patent of the United States is:

1. A fluid amplifier having no moving mechanical parts and comprising a relatively thick top lamination composed of a nonporous structurally rigid material, fluid entrance and exit means disposed within said top lamination, a predetermined number of relatively thin intermediate laminations composed of said material, said thin laminations each having an opening therethrough, each said opening defining a similar fluid flow configuration comprising a plurality of fluid flow paths defining a man fluid input passage, a pair of fluid receiving passages downstream of said main input passage and a pair of opposed control fluid input passages intermediate the main input passage and receiving passages, each said opening being totally enclosed within the boundary of the thin laminations, said thin laminations superposed in congruent relationship said main fluid input passage and control fluid input passages each terminating in a fluid flow restrictor, and selected ones of said thin laminations having said openings therethrough nonidentical in shape whereby the fluid flow restrictors have predetermined odd shaped cross sections, the predetermined number of thin laminations determining the flow capacity rating of the fluid amplifier, said fluid entrance and exit means positioned adjacent the ends of said fluid flow paths and in communication therewith, and a relatively thick bottom lamination composed of said material, said top, intermediate and bottom laminations superposed to form a unitary hermetically sealed structure having no moving mechanical parts.

2. The fluid amplifier set forth in claim 1 wherein the fluid flow restrictors have a diamond shape in cross section.

References Cited

UNITED STATES PATENTS

| | | | |
|---|---|---|---|
| 3,057,551 | 10/1962 | Etter | 137—81.5 |
| 3,144,390 | 12/1963 | Glattli | 137—81.5 |
| 3,148,691 | 9/1964 | Greenblott | 137—81.5 |
| 3,156,157 | 11/1964 | Smith et al. | |
| 3,225,779 | 12/1965 | Lootzook | 137—81.5 |
| 2,947,320 | 8/1960 | Oxley et al. | 137—271 |
| 3,285,265 | 11/1966 | Boothe et al. | 137—81.5 |

SAMUEL SCOTT, *Primary Examiner*.